US012549985B2

(12) United States Patent
Ren et al.

(10) Patent No.: US 12,549,985 B2
(45) Date of Patent: Feb. 10, 2026

(54) DYNAMIC DISABLING OF CLI MEASUREMENTS

(71) Applicant: QUALCOMM Incorporated, San Diego, CA (US)

(72) Inventors: Yuwei Ren, Beijing (CN); Huilin Xu, Temecula, CA (US); Qunfeng He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/998,026

(22) PCT Filed: Jun. 15, 2020

(86) PCT No.: PCT/CN2020/096047
§ 371 (c)(1),
(2) Date: Nov. 4, 2022

(87) PCT Pub. No.: WO2021/253150
PCT Pub. Date: Dec. 23, 2021

(65) Prior Publication Data
US 2023/0224054 A1    Jul. 13, 2023

(51) Int. Cl.
*H04B 17/309*    (2015.01)
*H04W 24/10*    (2009.01)
(Continued)

(52) U.S. Cl.
CPC ......... *H04W 24/10* (2013.01); *H04W 52/365* (2013.01); *H04W 72/232* (2023.01)

(58) Field of Classification Search
CPC .. H04B 17/309; H04B 17/318; H04B 17/345; H04W 24/10; H04W 72/232; H04W 52/365
(Continued)

(56) References Cited

U.S. PATENT DOCUMENTS

2019/0260486 A1\* 8/2019 Kang ................. H04L 5/0007
2019/0394662 A1   12/2019 Josan et al.
(Continued)

FOREIGN PATENT DOCUMENTS

CN    102104897 A    6/2011
CN    108809454 A    11/2018
(Continued)

OTHER PUBLICATIONS

Ericsson: "On UE-side Cross-link Interference Measurement and Reporting", 3GPP TSG RAN WG1 Meeting Ad-Hoc Meeting 1901, R1-1900758, 3rd Generation Partnership Project, Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019, 10 Pages, XP051593605, figure 2, sections 2, 3, 4; p. 5-p. 10.
(Continued)

*Primary Examiner* — Candal Elpenord
(74) *Attorney, Agent, or Firm* — ArentFox Schiff, LLP

(57) ABSTRACT

Methods, apparatuses, and computer readable medium for wireless communication is provided to dynamic disabling and enabling of cross-link interference (CLI) measurements. An example method includes receiving a configuration from a base station for CLI measurement. The example method further includes receiving a dynamic control signal from the base station to disable the CLI measurement. The example method further includes skipping one or more CLI measurements in response to receiving the dynamic control signal.

29 Claims, 13 Drawing Sheets

(51) Int. Cl.
*H04W 52/36* (2009.01)
*H04W 72/232* (2023.01)
(58) Field of Classification Search
USPC ............................................. 370/252
See application file for complete search history.

(56) References Cited

U.S. PATENT DOCUMENTS

| | | | |
|---|---|---|---|
| 2020/0169341 A1 | 5/2020 | Hwang et al. | |
| 2020/0266908 A1* | 8/2020 | Qian | H04W 24/08 |
| 2020/0389805 A1* | 12/2020 | Kim | H04W 72/23 |
| 2021/0144574 A1* | 5/2021 | Jin | H04L 5/0048 |
| 2022/0046459 A1 | 2/2022 | Kim et al. | |
| 2022/0158782 A1* | 5/2022 | Qi | H04L 5/0053 |
| 2022/0386156 A1* | 12/2022 | Park | H04W 24/10 |
| 2023/0319605 A1* | 10/2023 | Park | H04L 5/00 370/252 |

FOREIGN PATENT DOCUMENTS

| | | |
|---|---|---|
| CN | 109151921 A | 1/2019 |
| CN | 109219970 A | 1/2019 |
| CN | 110049510 A | 7/2019 |
| CN | 110139306 A | 8/2019 |
| EP | 3611866 A1 | 2/2020 |
| WO | 2019098395 A1 | 5/2019 |
| WO | 2019154350 A1 | 8/2019 |

OTHER PUBLICATIONS

Nokia, et al., "UE CLI Measurement Configuration and Reporting", 3GPP TSG-RAN2#107, R2-1909023, 3rd Generation Partnership Project (3GPP), Mobile Competence Centre, 650, Route Des Lucioles, F-06921 Sophia-Antipolis Cedex, France, vol. RAN WG2, No. Prague, Czech Republic; Aug. 26, 2019-Aug. 30, 2019, Aug. 15, 2019, XP051766833, 11 Pages, sections 1, 2; p. 1-p. 3; figure 1, sections 4, 5; p. 7-p. 10.
Supplementary European Search Report—EP20940571—Search Authority—The Hague—Jan. 29, 2024.
International Search Report and Written Opinion—PCT/CN2020/096047—ISA/EPO—Mar. 8, 2021.

* cited by examiner

DYNAMIC DISABLING OF CLI MEASUREMENTS

CROSS REFERENCE TO RELATED APPLICATION(S)

This application is a National Phase entry of PCT Application No. PCT/CN2020/096047, entitled "DYNAMIC DISABLING OF CLI MEASUREMENTS" and filed on Jun. 15, 2020, which is expressly incorporated by reference herein in its entirety.

BACKGROUND

Technical Field

The present disclosure relates generally to communication systems, and more particularly, to wireless communication including cross-link interference (CLI) measurements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In wireless communication systems such as a time division duplex (TDD) based wireless communication system, user equipment (UEs) that are physically near each other may have different uplink (UL)-downlink (DL) slot formats. One victim UE may receive transmission from another aggressor UE. A DL symbol to be received by the victim UE may collide with, i.e., overlap in time, with an interfering UL symbol of the aggressor UE, resulting in CLI. The CLI may be caused by various UL transmissions from the aggressor UE, such as physical uplink control channel (PUCCH), physical uplink shared channel (PUSCH), physical random access channel (PRACH) preamble, or sounding reference signal (SRS). To manage such CLI, a UE may be configured to measure CLI resources for interference management. In some wireless communication systems, the CLI measurements may be based on radio resource control (RRC) configuration. In such wireless communication systems, the UE may not be able to disable CLI measurements, which can consume large amounts of power and lead to inefficiency. In addition, because the network may transmit the RRC configuration in order to disable or re-enable the CLI measurements, the signaling overhead to disable or re-enable CLI measurements may result in additional inefficient use of radio resources. A more flexible and dynamic mechanism for network to disable and re-enable CLI measurement without full RRC reconfiguration is provided herein.

In an aspect of the disclosure, a method, a computer-readable medium, and' an apparatus are provided. The apparatus is configured to receive a configuration from a base station for CLI measurement. The apparatus is further configured to receive a dynamic control signal from the base station to disable the CLI measurement. The apparatus is further configured to skip one or more CLI measurements in response to receiving the dynamic control signal.

In another aspect of the disclosure, a method, a computer-readable medium, and an apparatus are provided. The apparatus is configured to transmit a configuration for CLI measurement to a UE. The apparatus is further configured to determine to disable CLI measurement for the UE. The apparatus is further configured to transmit a dynamic control signal to the UE to cause the UE to skip one or more CLI measurements in response to receiving the dynamic control signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
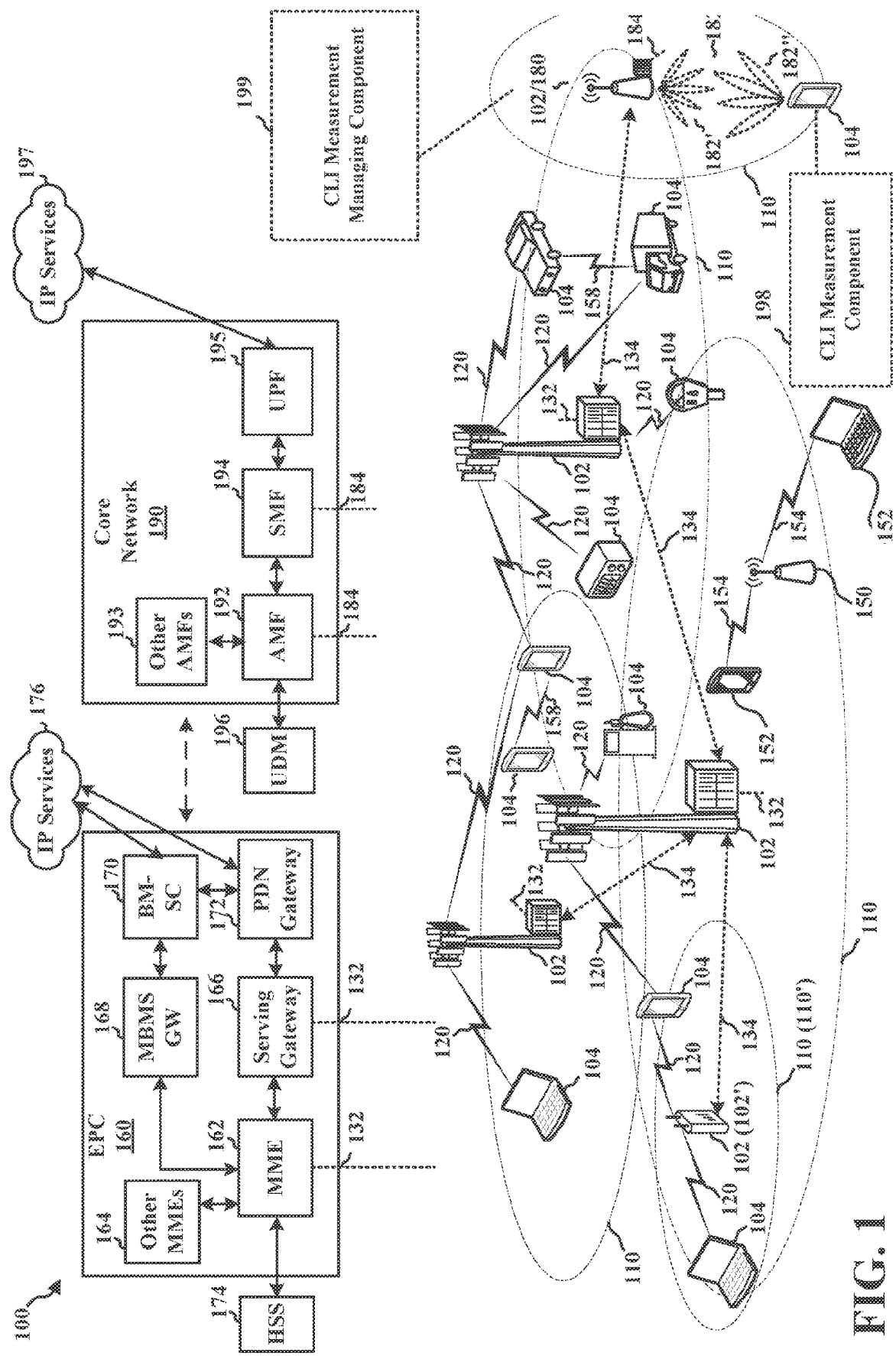
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., Si interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency (RF) band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, CLI measurement component 198 of the UE 104 may be configured to receive a configuration from the base station 180 for CLI measurement. The CLI measurement component 198 may be further configured to receive a dynamic control signal from the base station 180 to disable the CLI measurement. The CLI measurement component 198 may be further configured to skip one or more CLI measurements in response to receiving the dynamic control signal.

CLI measurement managing component 199 of the base station 180 may be configured to transmit a configuration for CLI measurement to the UE 104. CLI measurement managing component 199 of the base station 180 may be further configured to determine to disable CLI measurement for the UE 104. CLI measurement managing component 199 of the base station 180 may be further configured to transmit a dynamic control signal to the UE 104 to cause the UE 104 to skip one or more CLI measurements in response to receiving the dynamic control signal.

Figures 2A, 2B, 2C, 2D:
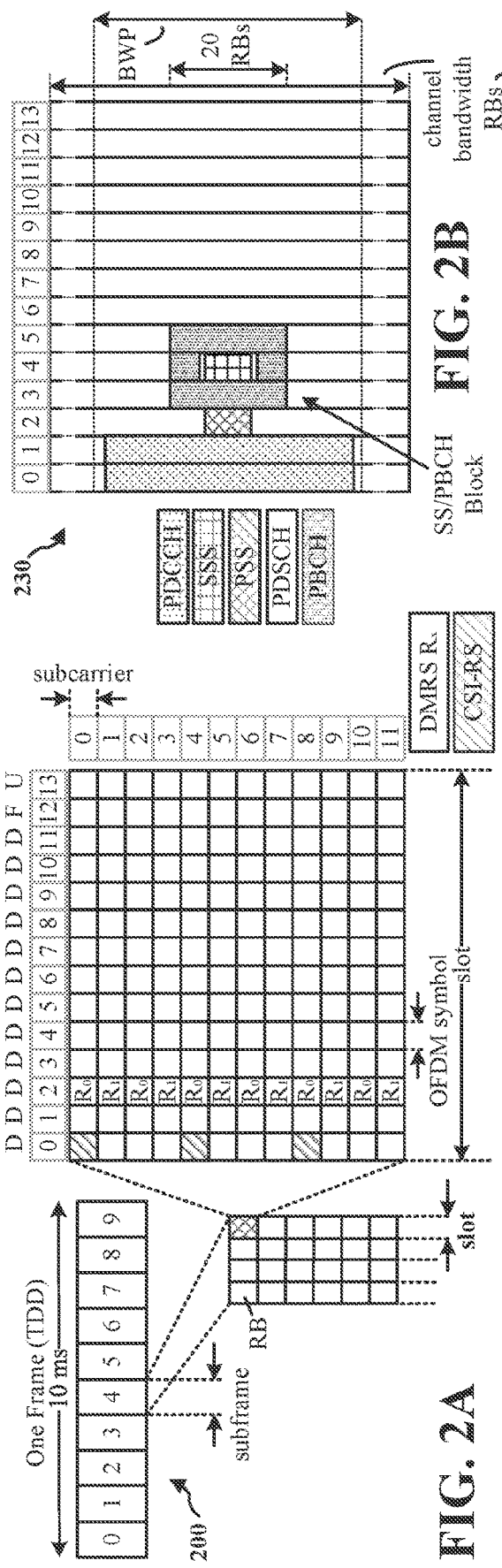
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may be associated with a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the PUCCH and DM-RS for the PUSCH. The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
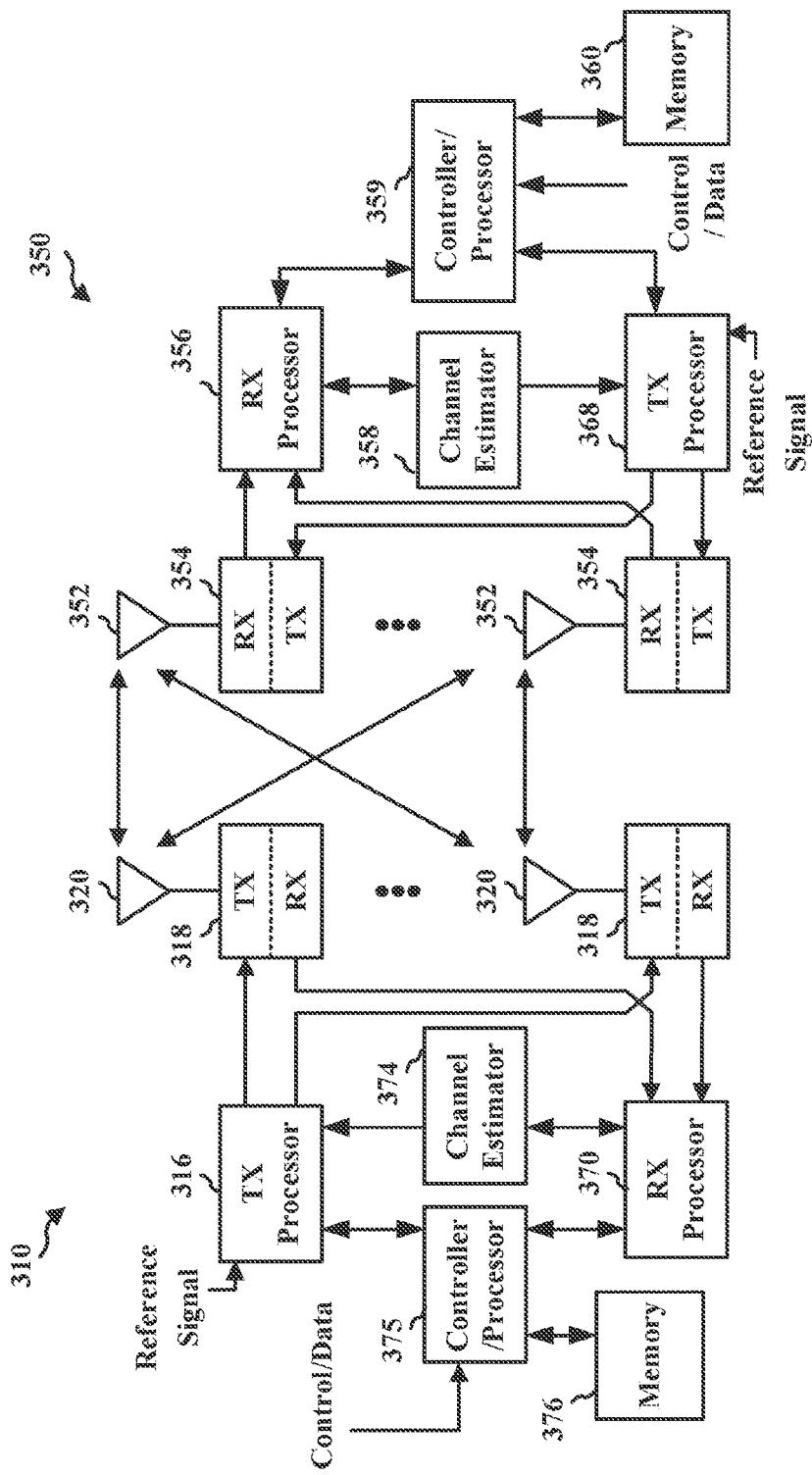
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the CLI measurement component 198 of FIG. 1.

At least one of the TX processor 316, the RX processor 370, and the controller/processor 375 may be configured to perform aspects in connection with the CLI measurement managing component 199 of FIG. 1.

Figure 4:
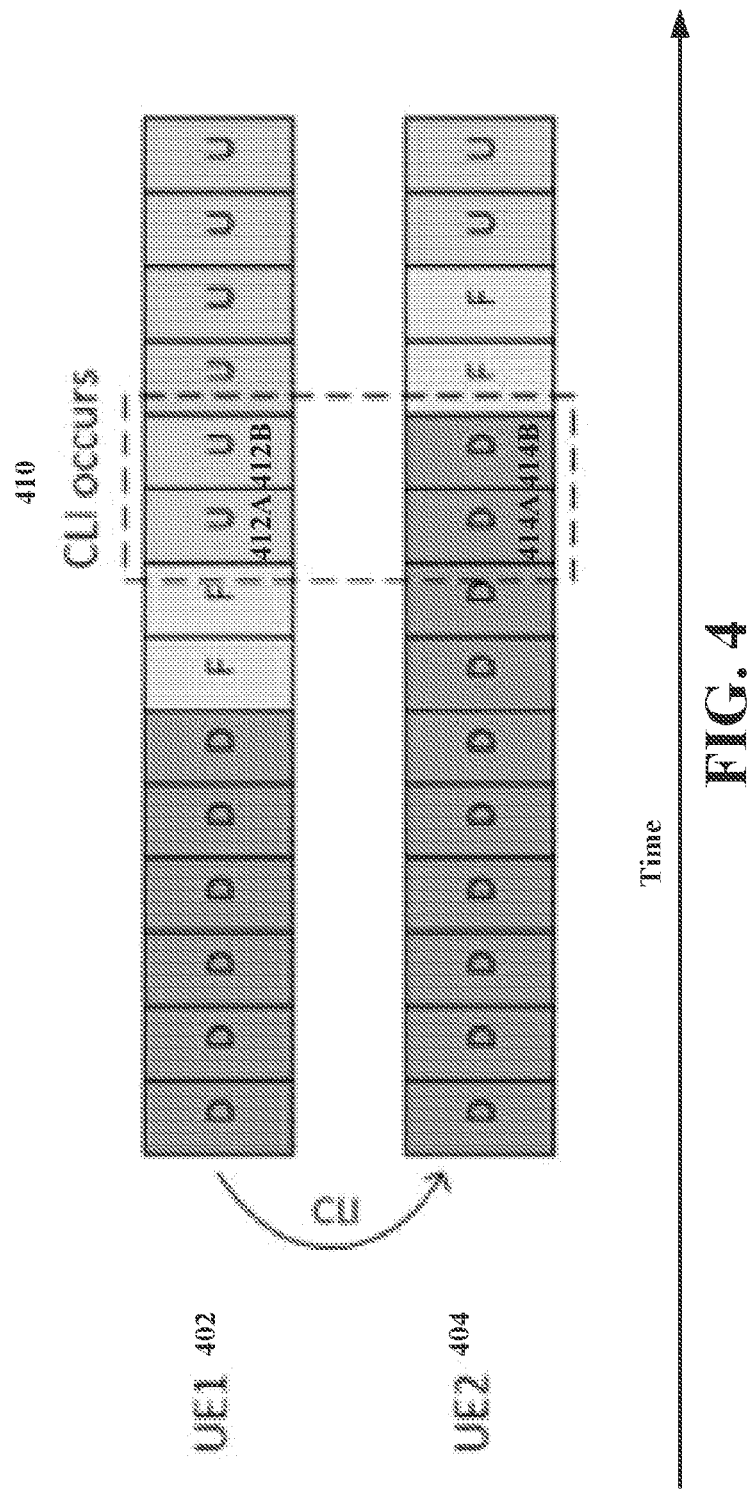
FIG. 4 illustrates an example of CLI.

In wireless communication systems such as a TDD based wireless communication system, UEs that are physically near each other may have different UL-DL slot formats. One UE (which may be referred to as a victim UE for purposes of CLI) may receive transmission from another UE (which may be referred to as an aggressor UE for purposes of CLI). A DL symbol to be received by the victim UE may collide with, i.e., overlap in time, with a interfering UL symbol of the aggressor UE, resulting in CLI. The CLI may be caused by various UL transmissions from the aggressor UE, such as PUCCH, PUSCH, PRACH preamble, or SRS. FIG. 4 illustrates an example overlap of communication resources for two UEs that may result in CLI. As illustrated in FIG. 4, a first UE 402 may be physically near a second UE 404, e.g., located within a receiving range of the second UE 404. One or more UL symbols 412A and 412B transmitted by the UE 402 may collide with one or more DL symbols 414A and 414B to be received by the UE 404 in time frame 410.

Therefore, there may be CLI between the first UE 402 (which may be referred to as the aggressor UE in the illustrated example) and the second UE 404 (which may be referred to as the victim UE in the illustrated example).

Figure 5A:
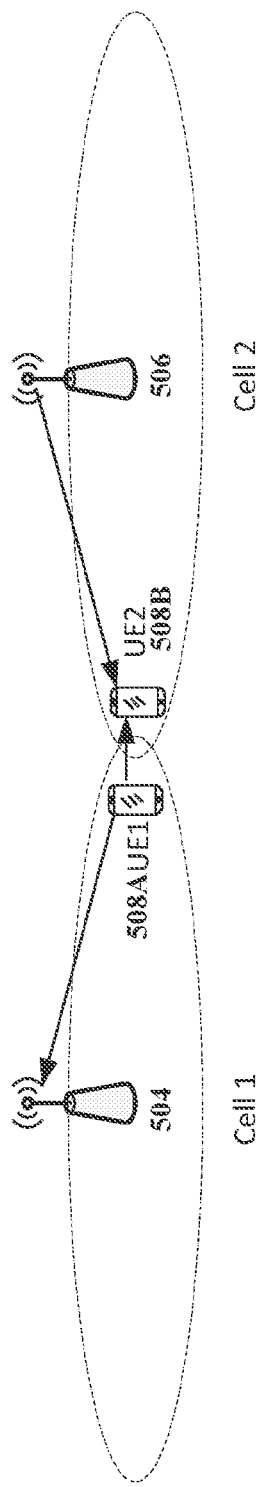
FIGS. 5A and 5B illustrate examples of CLI for UEs in a same cell and UEs in different cells.
Figure 5B:
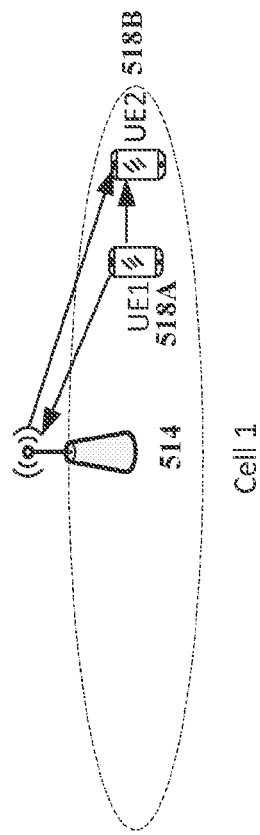

A victim UE does not need to have information regarding the aggressor UE's TDD UL/DL configuration, e.g., slot format, or SRS transmission configuration. The victim UEs may measure the CLI based on a network's CLI resource configuration, i.e., without blind detection of the CLI and then measurement by the victim UE before the network provides the CLI resource configuration. The CLI may occur between UEs within the same cell or UEs within different cells. FIGS. 5A and 5B illustrate examples of CLI for UEs within a same cell or within different cells. As illustrated in FIG. 5A, a first UE 508A in a first cell associated with a first base station 504 may have a UL transmission with the first base station 504. A second UE 508B in a second cell associated with a second base station 506 that is physically near the first UE 508A may be scheduled to receive a DL transmission that collides (overlap in time) with the UL transmission of the first UE 508A. As a result, the CLI may occur and the first UE 508A is the aggressor UE while the second UE 508B is the victim UE. Even though the first UE 508A and the second UE 508B are not in the same cell, the CLI may still occur due to the physical proximity between the first UE 508A and the second UE 508B. As illustrated in FIG. 5B, a first UE 518A and a second UE 518B may be in the same cell 514 managed by the same base station. The first UE 518A may have a UL transmission when the second UE 518B is scheduled to receive a DL transmission. Therefore, the CLI may occur between the first UE 518A and the second UE 518B where the first UE 518A is the aggressor UE and the second UE 518B is the victim UE.

To manage such CLI, a UE may be configured to measure CLI resources for interference management. The CLI measurement may be a SRS-RSRP, a CLI received signal strength indicator (RSSI), or the like. A measurement resource configuration may be provided in measurement objects. The configuration may include periodicity, frequency RBs and OFDM symbols where the CLI is to be measured.

In some wireless communication systems, the CLI measurements may be based on an RRC configuration. If the UE indicates support for CLI measurement in the UE's capability signaling report and if network configures CLI measurement resource to be measured by the UE, the UE may perform the CLI measurement based on the network configuration until the network provides a reconfiguration RRC message to disable the CLI measurement, e.g., to stop performing the CLI measurement. Thus, the UE may indicate support for the CLI measurement, and the base station may indicate to the UE whether or not to perform the CLI measurements.

In such wireless communication systems, the UE may not be able to dynamically disable the CLI measurements after receiving the configuration from the network to perform the CLI measurements. The UE may be configured with up to 64 resources for CLI RSSI measurement and up to 32 resources for SRS RSRP measurement. The power consumption for such measurements may be substantial for the UE.

In addition, because the network may transmit the RRC configuration to enable, disable or re-enable CLI measurements, the network signaling overhead may be substantial, resulting in additional inefficient usage of radio resources in the wireless communication system. The CLI measurement by the UE occupies time and frequency opportunities that could instead be used for a DL channel/signal transmitted from the serving base station for data communications. A more flexible and dynamic mechanism for the network to disable and re-enable CLI measurement without full RRC reconfiguration is provided herein.

Figure 6:
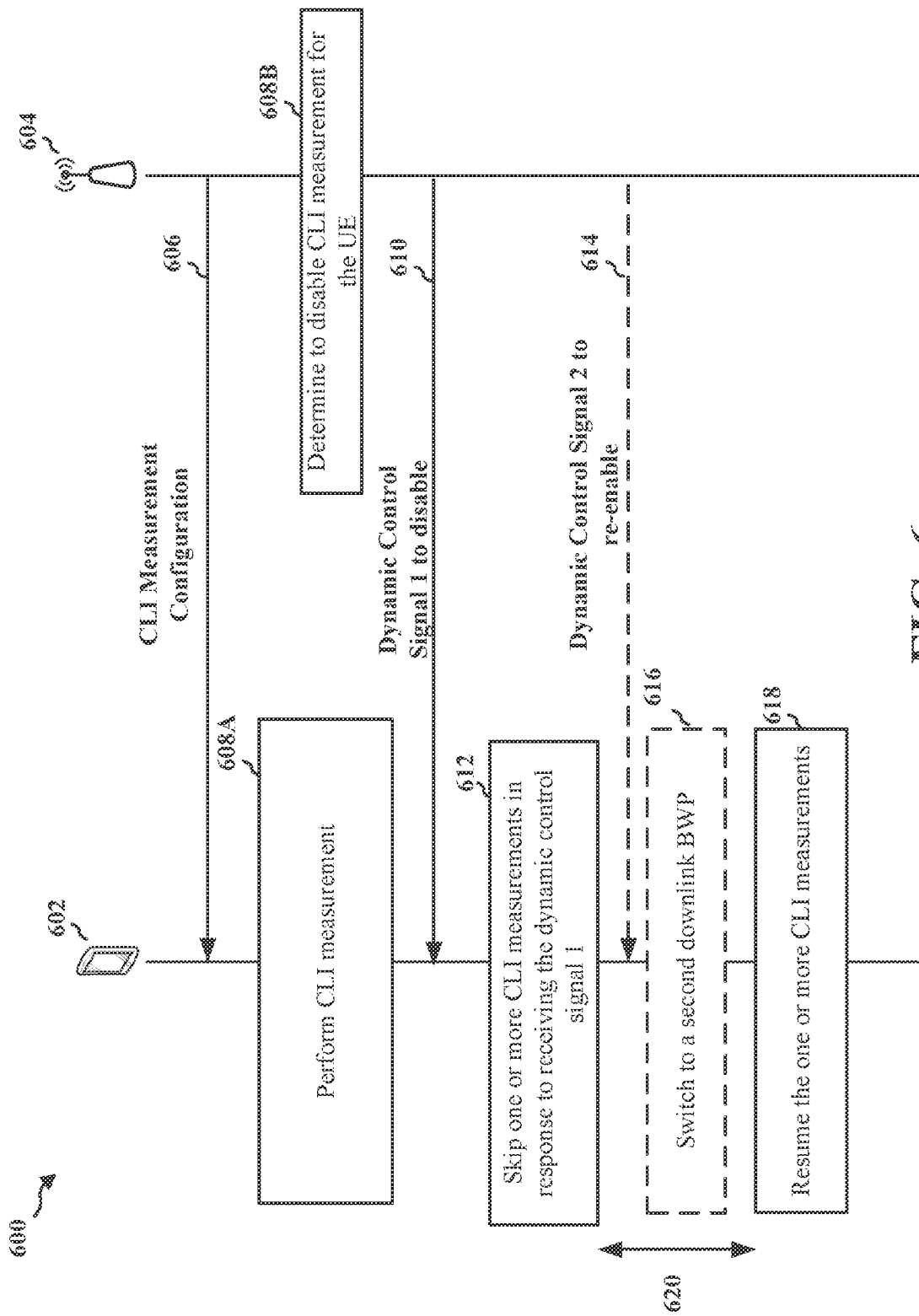
FIG. 6 illustrates an example communication flow between a base station and a UE.

FIG. 6 illustrates an example communication flow 600 between a base station 604 and a UE 602. Aspects of the base station 604 may be implemented by the base station 102/180 of FIG. 1, the apparatus 1302, or the like. Aspects of the UE 402 may be implemented by the UE 104 of FIG. 1, the apparatus 1202, or the like. At 606, the UE 602 may receive a CLI measurement configuration from the base station 604. The CLI measurement configuration may include one or more of a periodicity, frequency RBs and OFDM symbols where CLI is to be measured, or other parameters.

At 608A, the UE 602 may perform CLI measurements based on the received CLI measurement configuration. The CLI measurement may include CLI RSSI measurements, such as utilizing up to 64 resources for CLI RSSI measurement, or SRS RSRP measurements, such as utilizing up to 32 resources for SRS RSRP measurement.

At 608B, the base station 604 may determine to disable CLI measurements for the UE 602. For example, the base station 604 may determine to disable CLI measurements for the UE 602 to reduce power consumption of the UE 602. In another example, the base station 604 may determine to disable CLI measurements for the UE 602 to free up resources for CLI measurements that could have been used for DL channel/signal for data communications.

After determining to disable CLI measurements for the UE 602, at 610, the base station 604 may transmit a dynamic control signal to the UE 602 to disable CLI measurements. In some aspects, the dynamic control signal may be transmitted by the base station 604 and received by the UE 602 in a downlink control information (DCI) in a PDCCH. In some aspects, the dynamic control signal may be transmitted by the base station 604 and received by the UE 602 in a medium access control-control element (MAC-CE). In some aspects, the dynamic control signal may indicate one or more resources where the UE 602 may skip CLI measurements.

Figure 7:
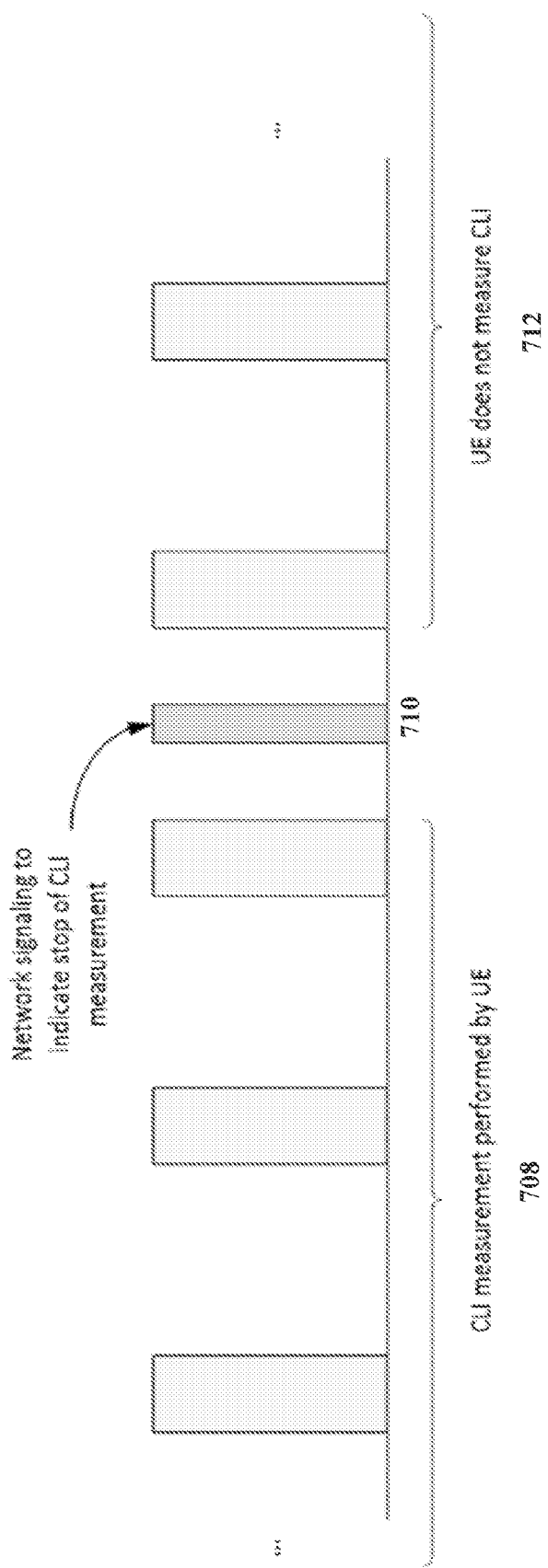
FIGS. 7-9 illustrate examples of skipping CLI measurements based on dynamic control signal and resuming CLI measurements.

At 612, the UE 602 skips one or more CLI measurements in response to receiving the dynamic control signal transmitted at 610. In some aspects, the UE 602 may skip one or more CLI measurements on the resources indicated in the dynamic control signal transmitted at 610. By skipping the CLI measurements, the UE 602 saves power and the DL resources become available for DL signal/channels from the base station. As illustrated in FIG. 7, a UE may perform the CLI measurements on resources at 708. The UE may receive network signaling from the set of CLI measurement resources, and wherein the dynamic control signal cau signaling, the UE may stop measuring CLI at 712.

Figure 8:
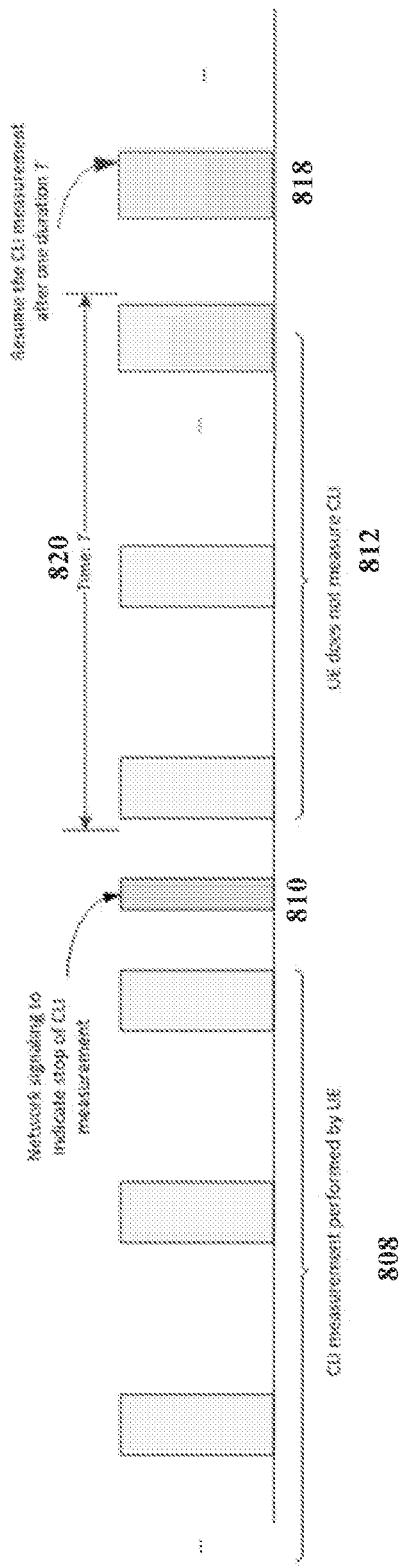

In some aspects, the dynamic control signal at 610 may indicate a time duration 620. The UE 602 may resume the CLI measurements at 618 after the time duration 620 has elapsed. As illustrated in FIG. 8, a UE may perform CLI measurements at 808. The UE may receive network signaling from a base station to indicate stop of CLI measurements at 810. Responsive to the signaling, the UE may stop measuring CLI at 812. After a time duration 820 indicated in the signaling has elapsed, the UE may resume CLI measurements at 818.

The dynamic control signal at 610 may indicate CLI measurement resources that the UE 602 can continue to measure after receiving the signaling. The indication of CLI measurement resources may include a list of measurement resource indices or a maximum number of measurement resources. For example, the UE 602 may measure the number of resources starting with the resource from the lowest index to the higher indices. In some aspects, separate indications can be provided for different measurements, e.g., for SRS-RSRP and RSSI. For example, the dynamic control signal may disable one of SRS-RSRP and RSSI measurements without disabling another one of the measurements. In some aspects, if the base station 604 determined to disable the CLI measurement for the UE 602 to save power, the dynamic control signal may disable the SRS-RSRP measurements, e.g., without disabling another CLI measurement. The SRS-RSRP measurements may consume more power than RSSI measurements while having a similar effect compared with RSSI measurements in occupying radio resources. In some aspects, the base station may transmit a joint indication to the UE for both the SRS-RSRP and the RSSI measurements.

Figure 9:
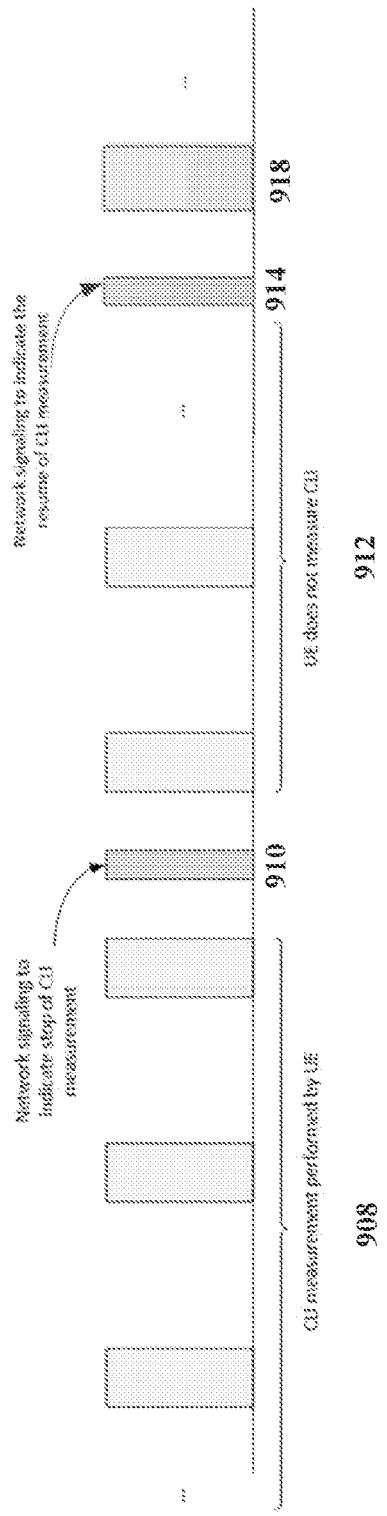

In some aspects, the UE 602 may resume the CLI measurements at 618 after receiving a second dynamic control signal to re-enable CLI measurements at 614. The second dynamic control signal may be transmitted/received in DCI in a PDCCH or in a MAC-CE. The second dynamic control signal may indicate for the UE to resume the CLI measurements, such as the SRS-RSRP measurements, the CLI RSSI measurements, or both measurements. As illustrated in FIG. 9, a UE may perform the CLI measurements at 908. The UE may receive network signaling from a base station to indicate stop the CLI measurements at 910. Responsive to the signaling, the UE may stop measuring the CLI at 912. After receiving a second dynamic signal to resume the CLI measurements at 914, the UE may resume the CLI measurements at 918.

In some aspects, if the base station 604 indicates in the first dynamic control signal to the UE 602 to stop measuring the CLI resources in one active BWP. The UE 602 may perform or resume the CLI measurement for CLI resources on a second active BWP, e.g., after switching to the second active BWP at 616. Thus, the indication from the base station may be BWP specific, and the UE may perform a different action for CLI measurement in a different BWP.

Figure 10:
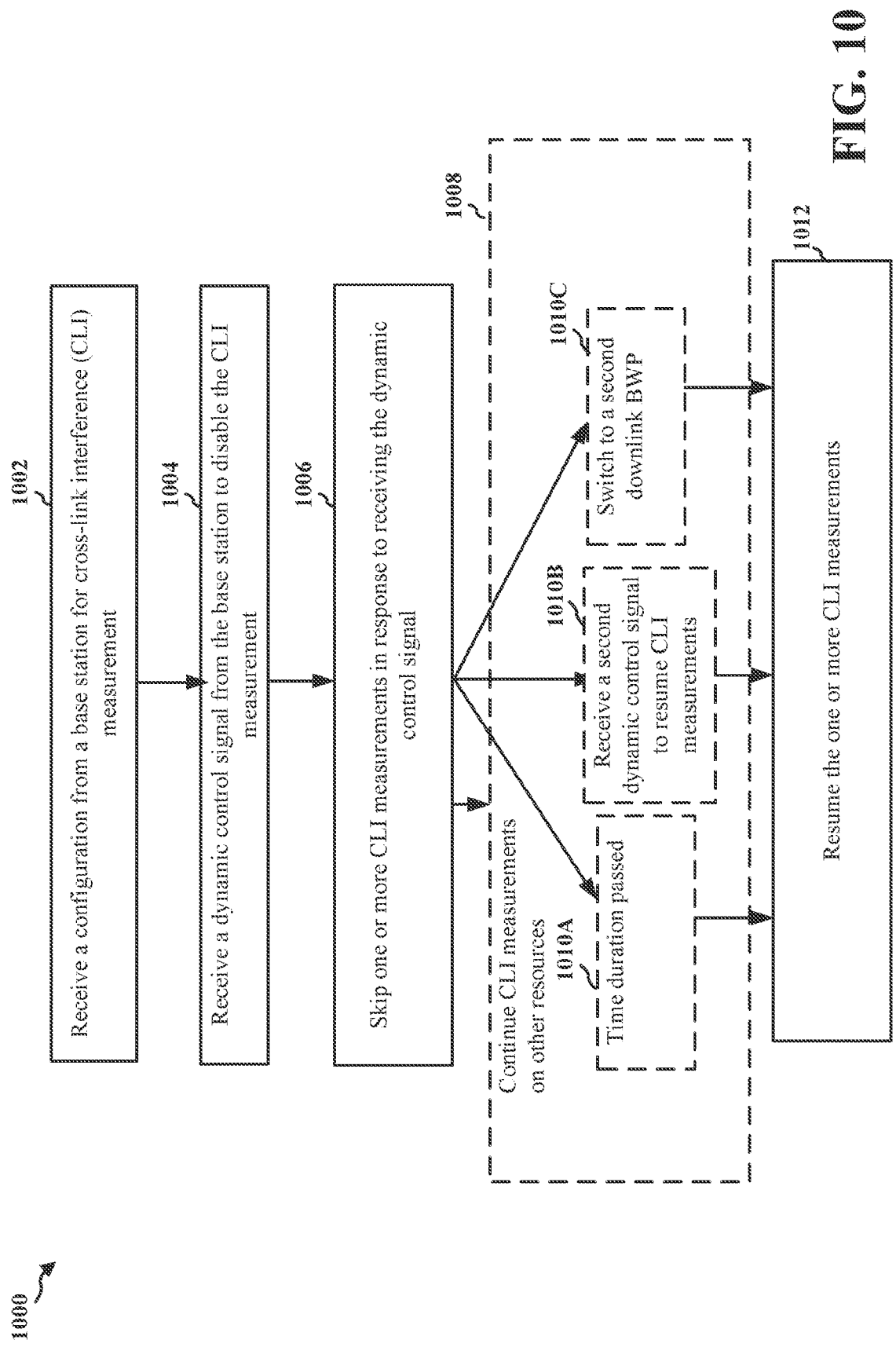
FIG. 10 is a flowchart of a method of wireless communication at a UE.

FIG. 10 is a flowchart 1000 of a method of wireless communication. The method may be performed by a UE (e.g., the UE 104, 350, 508A, 508B, 518A, 518B, 602; the apparatus 1202). Optional aspects are illustrated with a dashed line. The method may improve the efficient use of wireless resources and power savings at the UE in connection with performing CLI measurements.

At 1002, the UE receives a configuration from a base station for CLI measurement. For example, the reception at 1002 may be performed by the CLI measurement configuration reception component 1240 of FIG. 12. The reception 1002 may include aspects described in connection with reception 606 of FIG. 6.

At 1004, the UE receives a dynamic control signal from the base station to disable the CLI measurement. For example, the reception at 1004 may be performed by the dynamic control signal reception component 1242 of FIG. 12. The reception 1004 may include aspects described in connection with reception of the dynamic control signal at 610 of FIG. 6. In some aspects, the dynamic control signal may be received in a DCI in a PDCCH. In some aspects, the dynamic control signal may be received in a MAC-CE. In some aspects, the dynamic control signal may indicate one or more CLI measurement resources. In some aspects, the dynamic control signal may indicate an additional set of CLI measurement resources. In some aspects, the additional set of CLI measurement resources may comprise a list of measurement resources indices or a maximum number of measurement resources.

At 1006, the UE skips one or more CLI measurements in response to receiving the dynamic control signal. For example, the skipping at 1006 may be performed by the CLI measurement skipping component 1244 of FIG. 12. The skipping 1006 may include aspects described in connection with the skipping at 612 of FIG. 6. In some aspects, the UE skips the one or more CLI measurements for the one or more CLI measurement resources indicated in the dynamic control signal. In some aspects, the dynamic control signal may comprise a first indication for SRS-RSRP and a second indication for RSSI. In some aspects, the dynamic control signal may comprise a same indication for both SRS-RSRP and RSSI.

In aspects where the dynamic control signal indicates an additional set of CLI measurement resources, the UE may continue the CLI measurements on the additional set of CLI measurement resources at 1008 while skipping the one or more CLI measurements.

In some aspects, the dynamic control signal may indicate a duration of time. In such aspects, the UE may skip the one or more CLI measurements for the duration of time. After the duration of time lapses at 1010A, the UE may resume the one or more CLI measurements at 1012.

In some aspects, the UE may receive a second dynamic control signal from the base station to resume CLI measurements at 1010B. The UE may resume the one or more CLI measurements at 1012 in response to receiving the second dynamic control signal.

In some aspects, the dynamic control signal indicates a first downlink BWP to skip CLI measurements. In such aspects, the UE may switch to a second downlink BWP at 1010C and may then resume the one or more CLI measurements on the second downlink BWP at 1012.

Figure 11:
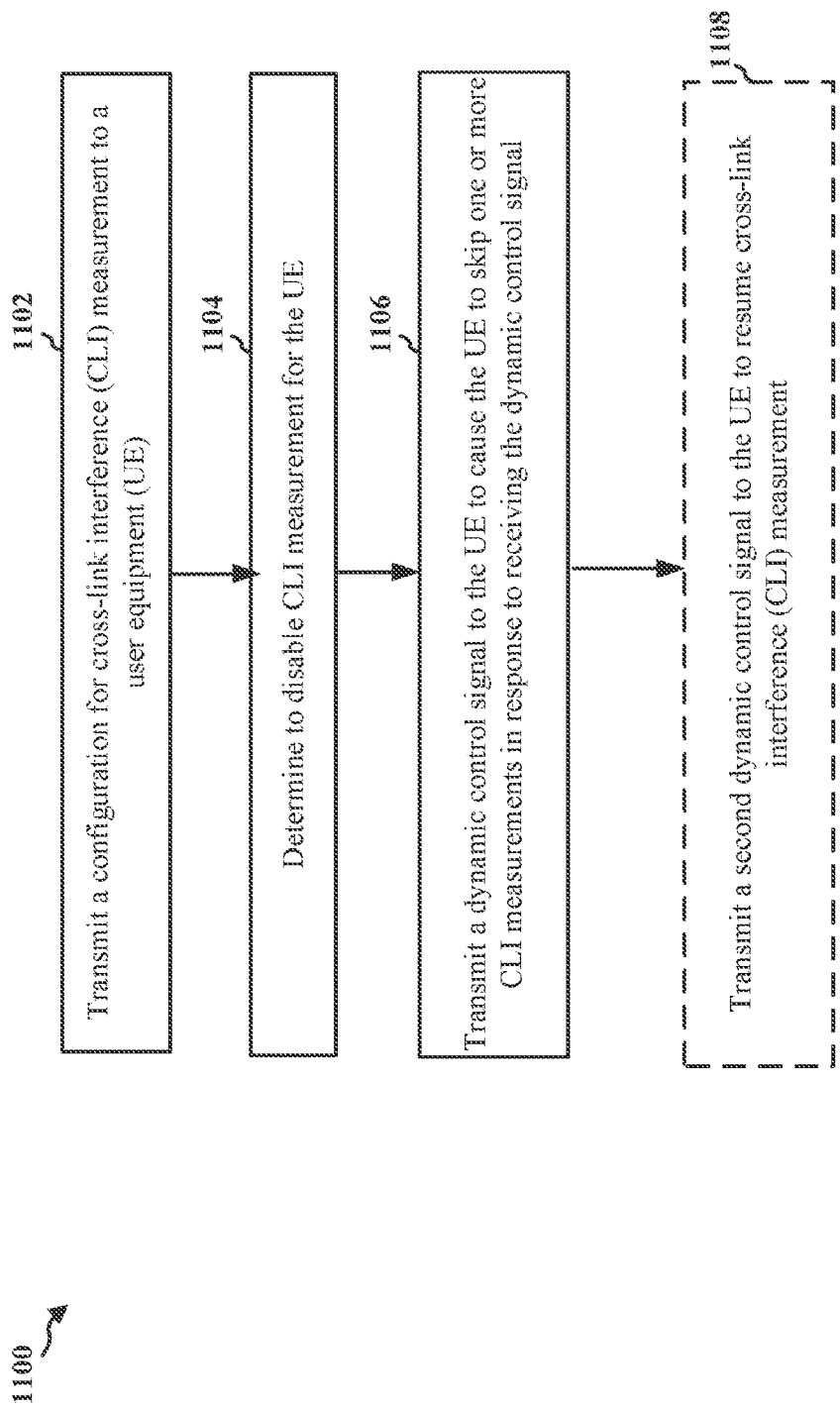
FIG. 11 is a flowchart of a method of wireless communication at a base station.

FIG. 11 is a flowchart 1100 of a method of wireless communication. The method may be performed by a base station (e.g., the base station 102/180, 310, 504, 506, 514, 604; the apparatus 1302. Optional aspects are illustrated with a dashed line. The method may improve the efficient use of wireless resources and may enable the base station to assist the UE in achieving power savings in connection with performing CLI measurements.

At 1102, the base station transmit a configuration for CLI measurement to a UE. For example, transmission 1102 may be performed by CLI measurement configuration transmission component 1340 of FIG. 13. Transmission 1102 may include aspects described in connection with reception 606 of FIG. 6.

At 1104, the base station determines to disable CLI measurement for the UE. For example, determination 1104 may be performed by CLI measurement determination component 1342 of FIG. 13. The determination at 1102 may include aspects described in connection with determination 608B of FIG. 6.

At 1106, the base station transmits a dynamic control signal to the UE to cause the UE to skip one or more CLI measurements in response to receiving the dynamic control signal. For example, the transmission at 1106 may be performed by the dynamic control signal transmission component 1344 of FIG. 13. The transmission at 1106 may include aspects described in connection with transmission of the dynamic control signal at 610 of FIG. 6. In some aspects, the dynamic control signal may be transmitted in a DCI in a PDCCH. In some aspects, the dynamic control signal may be transmitted in a MAC-CE. In some aspects, the dynamic control signal may indicate one or more CLI measurement resources. The UE may skip the one or more CLI measurements for the one or more CLI measurement resources indicated in the dynamic control signal.

In some aspects, the dynamic control signal may indicate a duration of time. In such aspects, skipping the one or more CLI measurements in response to receiving the dynamic control signal may include skipping the one or more CLI measurements for the duration of time indicated in the dynamic control signal. In some aspects, the dynamic control signal may further cause the UE to resume the one or more CLI measurements after the duration of time elapses.

In some aspects, the dynamic control signal indicates an additional set of CLI measurement resources and the dynamic control signal may cause the UE to measure the additional set of CLI measurement resources while skipping the one or more CLI measurements. In some aspects, the additional set of CLI measurement resources may comprise a list of measurement resources indices or a maximum number of measurement resources. In some aspects, the dynamic control signal may comprise a first indication for SRS-RSRP and a second indication for RSSI. In some aspects, the dynamic control signal may comprise a same indication for both SRS-RSRP and RSSI. In some aspects, the dynamic control signal may indicate a first DL BWP for the UE to skip measurements. The dynamic control signal may further cause the UE to resume the one or more CLI measurements on a second downlink BWP after switching to the second downlink BWP.

At 1108, the base station transmits a second dynamic control signal to the UE to resume CLI measurements. For example, the transmission 1108 may be performed by the dynamic control signal transmission component 1344 of FIG. 13. The transmission 1108 may include aspects described in connection with transmission 614 of FIG. 6.

Figure 12:
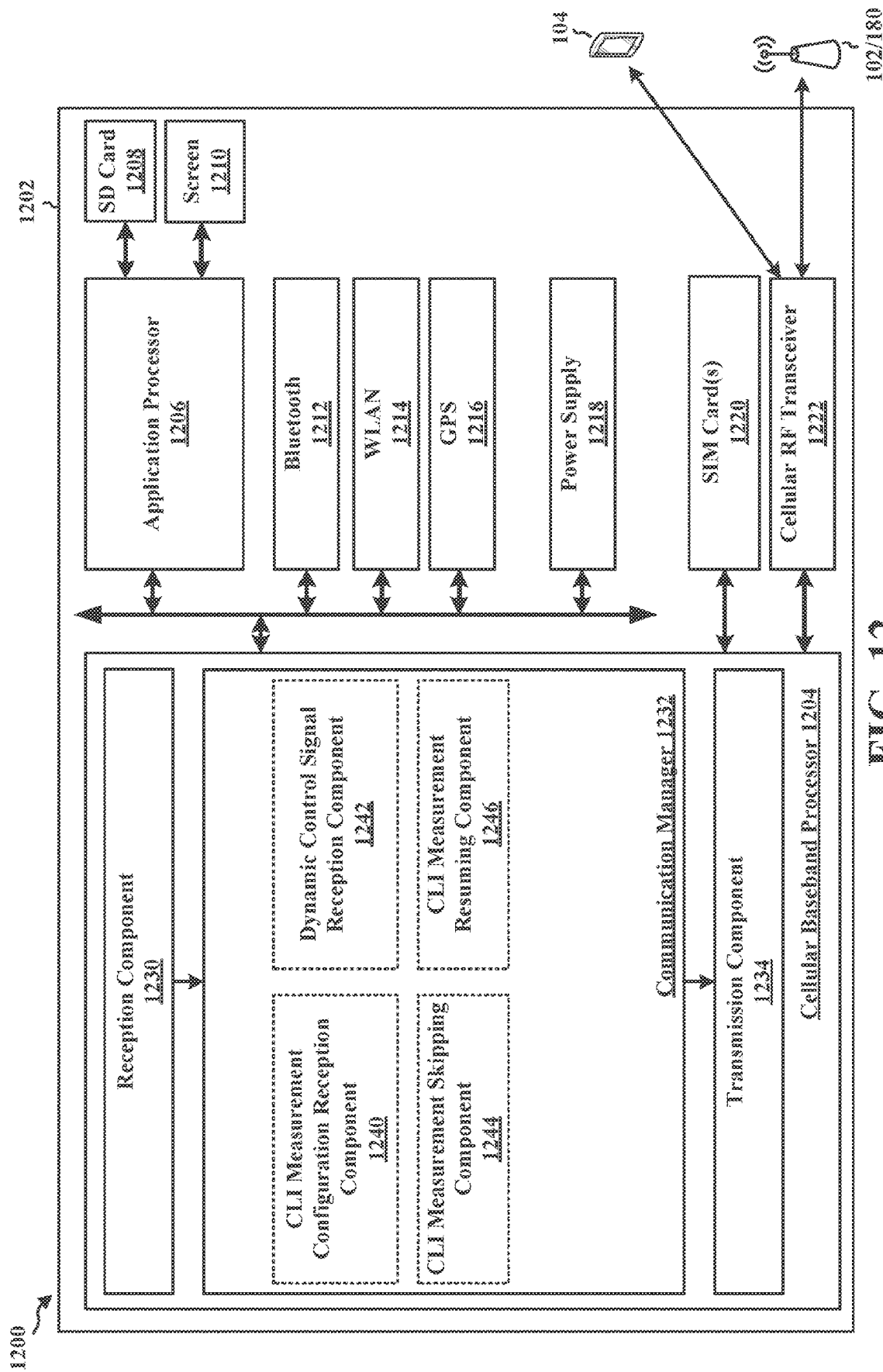
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a CLI measurement configuration reception component 1240 that is configured to receive a CLI measurement configuration, e.g., as described in connection with 1002 of FIG. 10. The communication manager 1232 further includes a dynamic control signal reception component 1242 that is configured to receive a dynamic control signal, e.g., as described in connection with 1004 and 1010B of FIG. 10. The communication manager 1232 further includes CLI measurements skipping component 1244 that is configured to skip one or more CLI measurements in response to receiving the dynamic control signal, e.g., as described in connection with 1006 of FIG. 10. The communication manager 1232 further includes a CLI measurement resuming component 1246 that is configured to resume the one or more CLI measurements, e.g., as described in connection with 1012 of FIG. 10.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving a configuration from a base station for CLI measurement; means for receiving a dynamic control signal from the base station to disable the CLI measurement; and means for skipping one or more CLI measurements in response to receiving the dynamic control signal.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
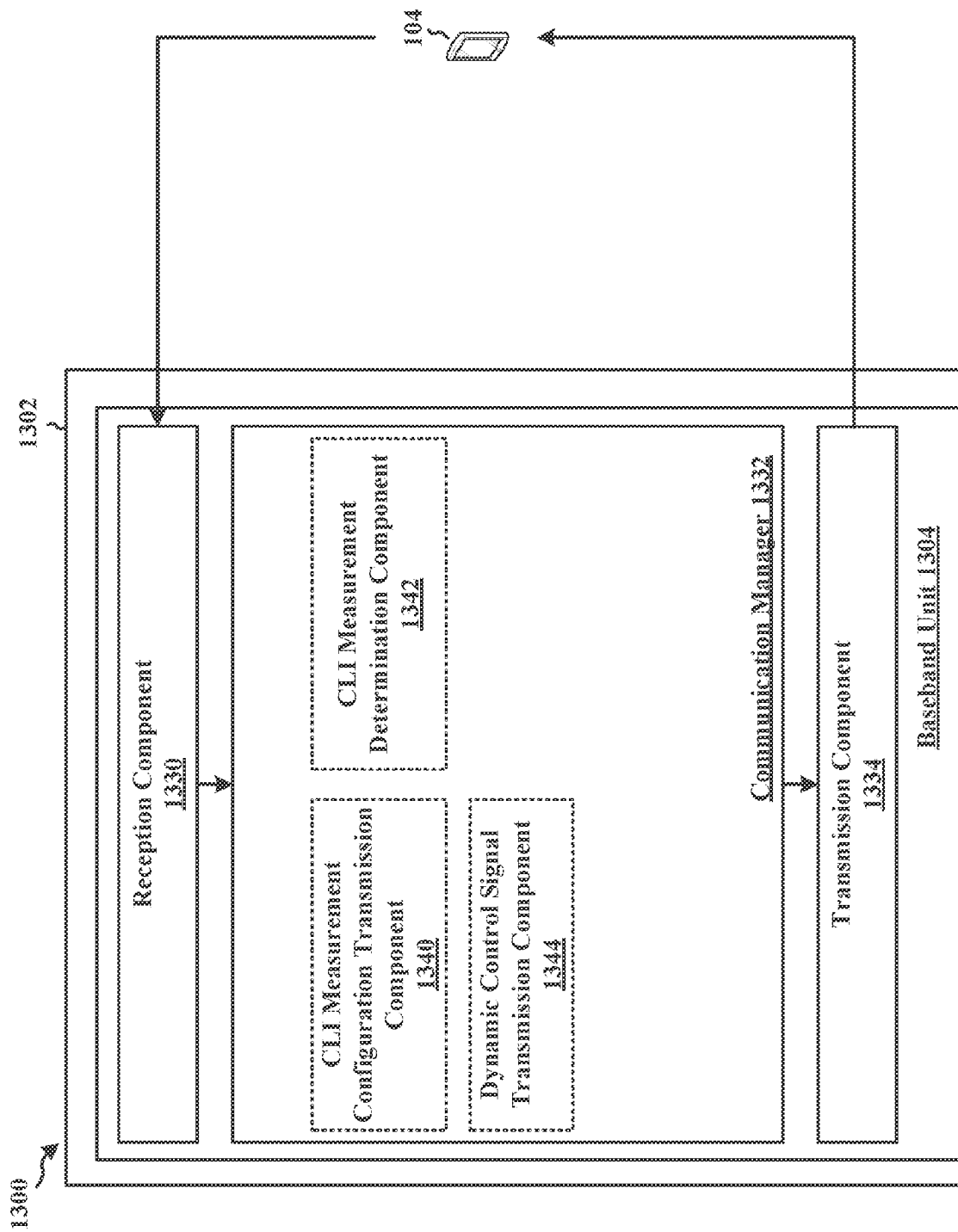
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes a CLI measurement configuration component 1340 that that is configured to transmit a configuration for CLI measurement to a UE, e.g., as described in connection with 1102 of FIG. 11. The communication manager 1332 further includes a CLI measurement determination component 1342 that that is configured to determine to disable CLI measurement for the UE, e.g., as described in connection with 1104 of FIG. 11. The communication manager 1332 further includes dynamic control signal transmission component 1344 that is configured to transmit a dynamic control signal to the UE to cause the UE to skip one or more CLI measurements in response to receiving the dynamic control signal, e.g., as described in connection with 1106 of FIG. 11. The dynamic control signal transmission component 1344 may be further configured to transmit a second dynamic control signal to the UE to resume CLI measurements.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting a configuration for CLI measurement to a UE; means for determining to disable CLI measurement for the UE; and means for transmitting a dynamic control signal to the UE to cause the UE to skip one or more CLI measurements in response to receiving the dynamic control signal.

The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Further disclosure is included in the Appendix.

The following examples are illustrative only and aspects thereof may be combined with aspects of other embodiments or teaching described herein, without limitation.

Example 1 is a method of wireless communication at a UE, comprising: receiving a configuration from a base station for CLI measurement; receiving a dynamic control signal from the base station to disable the CLI measurement; and skipping one or more CLI measurements in response to receiving the dynamic control signal.

In Example 2, the method of Example 1 further includes that the dynamic control signal is received in a DCI in a PDCCH.

In Example 3, the method of any of Examples 1-2 further includes that the dynamic control signal is received in a MAC-CE.

In Example 4, the method of any of Examples 1-3 further includes that the dynamic control signal indicates one or more CLI measurement resources, and wherein the UE skips the one or more CLI measurements for the one or more CLI measurement resources.

In Example 5, the method of any of Examples 1-4 further includes that the dynamic control signal indicates a duration of time, and wherein skipping the one or more CLI measurements in response to receiving the dynamic control signal comprises skipping the one or more CLI measurements for the duration of time indicated in the dynamic control signal.

In Example 6, the method of Example 5 further includes resuming the one or more CLI measurements after the duration of time lapses.

In Example 7, the method of any of Examples 1-6 further includes that the dynamic control signal indicates an additional set of CLI measurement resources, and further comprising measuring the additional set of CLI measurement resources while skipping the one or more CLI measurements.

In Example 8, the method of Example 7 further includes that the additional set of CLI measurement resources comprises a list of measurement resources indices or a maximum number of measurement resources.

In Example 9, the method of any of Examples 1-8 further includes that the dynamic control signal comprises a first indication for SRS-RSRP and a second indication for RSS).

In Example 10, the method of any of Examples 1-9 further includes that the dynamic control signal comprises a common indication for a SRS-RSRP and a RSSI.

In Example 11, the method of any of Examples 1-10 further includes: receiving a second dynamic control signal from the base station to resume the CLI measurement; and resuming the one or more CLI measurements in response to receiving the second dynamic control signal.

In Example 12, the method of any of Examples 1-11 further includes that the dynamic control signal indicates a first downlink BWP to skip CLI measurements on, the method further comprising: switching to a second downlink BWP; and resuming the one or more CLI measurements on the second downlink BWP.

Example 13 is a device including one or more processors and one or more memories in electronic communication with the one or more processors storing instructions executable by the one or more processors to cause the device to implement a method as in any of Examples 1-12.

Example 14 is a system or apparatus including means for implementing a method or realizing an apparatus as in any of Examples 1-12.

Example 15 is a non-transitory computer readable medium storing instructions executable by one or more processors to cause the one or more processors to implement a method as in any of Examples 1-12.

Example 16 is a method of wireless communication at a base station, comprising: transmitting a configuration for cross-link interference CLI measurement to a UE; determining to disable CLI measurement for the UE; and transmitting a dynamic control signal to the UE to cause the UE to skip one or more CLI measurements in response to receiving the dynamic control signal.

In Example 17, the method of Example 16 further includes that the dynamic control signal is transmitted in a DCI in PDCCH.

In Example 18, the method of any of Examples 16-17 further includes that the dynamic control signal is transmitted in a MAC-CE.

In Example 19, the method of any of Examples 16-18 further includes that the dynamic control signal indicates one or more CLI measurement resources, and wherein the UE skips the one or more CLI measurements for the one or more CLI measurement resources.

In Example 20, the of any of Examples 16-19 further includes that the dynamic control signal indicates a duration of time, and wherein skipping the one or more CLI measurements in response to receiving the dynamic control signal comprises skipping the one or more CLI measurements for the duration of time indicated in the dynamic control signal.

In Example 21, the method of any of Examples 16-20 further includes that the dynamic control signal further causes the UE to resume the one or more CLI measurements after the duration of time lapses.

In Example 22, the method of any of Examples 16-21 further includes that the dynamic control signal indicates an additional set of CLI measurement resources, and wherein the dynamic control signal causes the UE to measure the additional set of CLI measurement resources while skipping the one or more CLI measurements.

In Example 23, the method of any of Examples 16-22 further includes that the additional set of CLI measurement resources comprises a list of measurement resources indices or a maximum number of measurement resources.

In Example 24, the method of any of Examples 16-23 further includes that the dynamic control signal comprises a first indication for SRS-RSRP and a second indication for RSSI.

In Example 25, the method of any of Examples 16-24 further includes that the dynamic control signal comprises a common indication for a SRS-RSRP and a RSSI.

In Example 26, the method of any of Examples 16-25 further includes transmitting a second dynamic control signal to the UE to resume the CLI measurement.

In Example 27, the method of any of Examples 16-26 further includes that the dynamic control signal indicates a first BWP to skip CLI measurements on, and wherein the dynamic control signal causes the UE to resume the one or more CLI measurements on a second downlink BWP after switching to the second downlink BWP.

Example 28 is a device including one or more processors and one or more memories in electronic communication with the one or more processors storing instructions executable by the one or more processors to cause the device to implement a method as in any of Examples 16-27.

Example 29 is a system or apparatus including means for implementing a method or realizing an apparatus as in any of Examples 16-27.

Example 30 is a non-transitory computer readable medium storing instructions executable by one or more processors to cause the one or more processors to implement a method as in any of Examples 16-27.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a configuration from a base station for cross-link interference (CLI) measurement;
   receiving a dynamic control signal from the base station to disable the CLI measurement;
   skipping one or more CLI measurements in response to receiving the dynamic control signal,
   wherein the dynamic control signal comprises a first indication for sounding reference signal (SRS) reference signal received power (SRS-RSRP) and a second indication for received signal strength indicator (RSSI), and wherein the dynamic control signal indicates an additional set of CLI measurement resources; and
   measuring the additional set of CLI measurement resources while skipping the one or more CLI measurements.

2. The method of claim 1, wherein the dynamic control signal is received in a downlink control information (DCI) in a physical downlink control channel (PDCCH).

3. The method of claim 1, wherein the dynamic control signal is received in a medium access control-control element (MAC-CE).

4. The method of claim 1, wherein the dynamic control signal indicates one or more CLI measurement resources, and wherein the UE skips the one or more CLI measurements for the one or more CLI measurement resources.

5. The method of claim 1, wherein the dynamic control signal indicates a duration of time, and wherein skipping the one or more CLI measurements in response to receiving the dynamic control signal comprises skipping the one or more CLI measurements for the duration of time indicated in the dynamic control signal.

6. The method of claim 5, further comprising:
   resuming the one or more CLI measurements after the duration of time lapses.

7. The method of claim 1, wherein the additional set of CLI measurement resources comprises a list of measurement resources indices or a maximum number of measurement resources.

8. The method of claim 1, wherein the dynamic control signal comprises a common indication for the sounding reference signal (SRS) reference signal received power (SRS-RSRP) and the received signal strength indicator (RSSI).

9. The method of claim 1, further comprising:
   receiving a second dynamic control signal from the base station to resume the CLI measurement; and
   resuming the one or more CLI measurements in response to receiving the second dynamic control signal.

10. The method of claim 1, wherein the dynamic control signal indicates a first downlink bandwidth part (BWP) to skip CLI measurements on, the method further comprising:
    switching to a second downlink BWP; and
    resuming the one or more CLI measurements on the second downlink BWP.

11. An apparatus for wireless communication at a user equipment (UE), comprising:
    a memory; and
    at least one processor coupled to the memory and configured to perform the method of any of claim 1-6, 7, or 8-10.

12. A computer-readable medium storing computer executable code for wireless communication at a user equipment (UE), the code when executed by a processor cause the processor to perform the method of any of claim 1-6, 7, or 8-10.

13. An apparatus for wireless communication at a user equipment (UE), comprising:
    means for receiving a configuration from a base station for cross-link interference (CLI) measurement;
    means for receiving a dynamic control signal from the base station to disable the CLI measurement;
    means for skipping one or more CLI measurements in response to receiving the dynamic control signal,
    wherein the dynamic control signal comprises a first indication for sounding reference signal (SRS) reference signal received power (SRS-RSRP) and a second indication for received signal strength indicator (RSSI)), and wherein the dynamic control signal indicates an additional set of CLI measurement resources; and
    means for measuring the additional set of CLI measurement resources while skipping the one or more CLI measurements.

14. The apparatus of claim 13, further comprising means to perform the method of any of claim 2-6, 7, or 8-10.

15. A method of wireless communication at a base station, comprising:
- transmitting a configuration for cross-link interference (CLI) measurement to a user equipment (UE);
- determining to disable CLI measurement for the UE;
- transmitting a dynamic control signal to the UE to cause the UE to skip one or more CLI measurements in response to receiving the dynamic control signal,
- wherein the dynamic control signal comprises a first indication for sounding reference signal (SRS) reference signal received power (SRS-RSRP) and a second indication for received signal strength indicator (RSSI), and wherein the dynamic control signal indicates an additional set of CLI measurement resources; and measuring the additional set of CLI measurement resources while skipping the one or more CLI measurements.

16. The method of claim 15, wherein the dynamic control signal is transmitted in a downlink control information (DCI) in a physical downlink control channel (PDCCH).

17. The method of claim 15, wherein the dynamic control signal is transmitted in a medium access control-control element (MAC-CE).

18. The method of claim 15, wherein the dynamic control signal indicates one or more CLI measurement resources, and wherein the UE skips the one or more CLI measurements for the one or more CLI measurement resources.

19. The method of claim 15, wherein the dynamic control signal indicates a duration of time, and wherein skipping the one or more CLI measurements in response to receiving the dynamic control signal comprises skipping the one or more CLI measurements for the duration of time indicated in the dynamic control signal.

20. The method of claim 19, wherein the dynamic control signal further causes the UE to resume the one or more CLI measurements after the duration of time lapses.

21. The method of claim 15, wherein the dynamic control signal indicates an additional set of CLI measurement resources, and wherein the dynamic control signal causes the UE to measure the additional set of CLI measurement resources while skipping the one or more CLI measurements.

22. The method of claim 21, wherein the additional set of CLI measurement resources comprises a list of measurement resources indices or a maximum number of measurement resources.

23. The method of claim 15, wherein the dynamic control signal comprises a common indication for the sounding reference signal (SRS) reference signal received power (SRS-RSRP) and the received signal strength indicator (RSSI).

24. The method of claim 15, further comprising:
- transmitting a second dynamic control signal to the UE to resume the CLI measurement.

25. The method of claim 15, wherein the dynamic control signal indicates a first downlink bandwidth part (BWP) to skip CLI measurements on, and wherein the dynamic control signal causes the UE to resume the one or more CLI measurements on a second downlink BWP after switching to the second downlink BWP.

26. An apparatus for wireless communication at a base station, comprising:
- a memory; and
- at least one processor coupled to the memory and configured to perform the method of any of claim 15-22 or 23-25.

27. A computer-readable medium storing computer executable code for wireless communication at a base station, the code when executed by a processor cause the processor to perform the method of any of claim 15-22 or 23-25.

28. An apparatus for wireless communication at a base station,
- means for transmitting a configuration for cross-link interference (CLI) measurement to a user equipment (UE);
- means for determining to disable CLI measurement for the UE; and
- means for transmitting a dynamic control signal to the UE to cause the UE to skip one or more CLI measurements in response to receiving the dynamic control signal,
- wherein the dynamic control signal comprises a first indication for sounding reference signal (SRS) reference signal received power (SRS-RSRP) and a second indication for received signal strength indicator (RSSI), and wherein the dynamic control signal indicates an additional set of CLI measurement resources; and
- means for measuring the additional set of CLI measurement resources while skipping the one or more CLI measurements.

29. The apparatus of claim 28, further comprising means to perform the method of any of claim 16-22 or 23-25.

* * * * *